UNITED STATES PATENT OFFICE.

BRUNO KEETMAN, OF BERLIN, TREPTOW, GERMANY, ASSIGNOR TO DEUTSCHE GASGLUEHLICHT AKTIENGESELLSCHAFT, (AUERGESELLSCHAFT), OF BERLIN, GERMANY, A CORPORATION OF GERMANY.

PROCESS OF OBTAINING RADIOTHORIUM AND SOLUTIONS THEREFROM CONTAINING THORIUM-X.

1,151,187.    Specification of Letters Patent.    Patented Aug. 24, 1915.

No Drawing.    Application filed March 14, 1913.    Serial No. 754,219.

*To all whom it may concern:*

Be it known that I, BRUNO KEETMAN, a citizen of the German Empire, and a resident of Berlin, Treptow, Germany, have invented a new and useful Process of Obtaining Radiothorium and Solutions Therefrom Containing Thorium-X, of which the following is a specification.

The two known processes of obtaining thorium-X start with substances containing radiothorium. According to one of said processes thorium oxid containing radiothorium is subjected to lixiviation by shaking with water. This process, however, is objectionable because a large amount of water is necessary and because it does not result in a quantitative yield. According to the other of said processes salts containing radiothorium are precipitated with ammonia. Upon filtering there is obtained a filtrate which contains thorium-X together with very large amounts of ammonium salts, the precipitate left on the filter being very voluminous. In order to wash out of this precipitate all of the thorium-X therein, it is necessary to use a large amount of water and it is impossible to obtain the thorium-X free from ammonium salts. According to the two known methods, therefore, thorium-X can only be obtained either in very dilute solutions or contaminated with considerable amounts of ammonium salts.

The present invention is a process in which the substances containing radiothorium are transposed into hydroxids which are not voluminous but possess a high degree of density. Moreover these hydroxids have the characteristic of giving off the thorium-X quantitatively to very small amounts of water. The result is that thorium-X may be obtained free from ammonium salts and in highly concentrated solutions. A specific example of my process of treating substances containing radiothorium for this purpose may be stated as follows: The substance containing radiothorium is treated chemically so as to free it from impurities, especially barium, calcium, iron, lead, phosphoric acid and, if possible, cerite earths. The solution of the thus purified radiothorium-containing substance is then treated with chemically pure ammonia and the precipitate formed is thoroughly washed out and dissolved in dilute nitric acid. The excess of acid is removed by evaporation to dryness over a water bath. The residue, consisting of the pure nitrate, is dissolved in distilled water and again treated with an excess of chemically pure ammonia. The radiothorium-containing substances precipitate out as hydroxids and the supernatant liquid is removed by stirring and carefully evaporating to dryness, without separating out the precipitate. After being thoroughly cooled, the mass of precipitate is rubbed down in the presence of a suitable liquid, such as distilled water or a dilute solution of common salt free from carbonic acid, it is then allowed to settle and the turbid supernatant solution is siphoned off. This process is repeated (preferably in a high, narrow cylinder) until all of the ammonium salts are washed out and the radiothorium-containing hydroxid settles out uncontaminated. To the hydroxids thus obtained, which are very dense and have a very high specific weight, is added water or a dilute solution of common salt free from carbonic acid each of which is a neutral liquid capable of extracting thorium and the mixture is then allowed to stand until a sufficient amount of thorium-X is formed. By shaking a solution rich in thorium-X is then obtained, which may be used, for example, for therapeutic purposes.

It is known that the generation of thorium-X from the parent-substance (radiothorium) only takes place very slowly. At the same time the decomposition of thorium-X takes place. It has been found that the best results are had if the solution before it is used is allowed to stand from one to two days above the radiothorium. If the time is shorter, weaker solutions are obtained, if longer, the proportionate increase of yield which might be expected is counteracted by the decomposition which takes place during this time.

As the radiothorium obtained by the above process can be lixiviated quantitatively with very small amounts of distilled water or salt water, the great advantage is had that concentrated, pure solutions of thorium-X can be obtained, whereas according to the previously known processes, a much diluted solution or one containing ammonium salts was produced. Finally, it may be said that the use of a very weak solution of common salt, free from carbonic acid for the production of a solution containing thorium-X results in an advantage over the use of distilled water in that it prevents a colloidal formation of the radiothorium precipitate, which would render the solution turbid and necessarily result in a considerable loss of the mother-substance. It is to be understood that, instead of a common salt solution, solution of equivalent neutral salts may be used.

I claim:

1. The herein described process which consists in precipitating radiothorium or radiothorium-containing substances with ammonia, then evaporating to dryness the unseparated mixture of precipitate and liquid resulting from such precipitation operation and then washing the dry mixture with a liquid capable of removing the ammonium salts, thereby removing the ammonium salts from the dry evaporated residue and obtaining the radio-thorium or radiothorium-containing substance in the form of a dense, substantially pure hydroxid, substantially as and for the purpose described.

2. The herein described process which consists in precipitating radiothorium or radiothorium-containing substances with ammonia, then evaporating to dryness the unseparated mixture of precipitate and liquid resulting from such precipitation operation, then washing the dry mixture with a liquid capable of removing the ammonium salts, thereby removing the ammonium salts from the dry evaporated residue, and then placing the radiothorium or radiothorium-containing hydroxid thus obtained in contact with a neutral liquid capable of extracting thorium-X until a desired amount of thorium-X has formed, substantially as and for the purpose described.

In testimony whereof I have hereunto set my hand in the presence of two subscribing witnesses.

BRUNO KEETMAN.

Witnesses:
 HENRY HASPER,
 WOLDEMAR HAUPT.